(12) United States Patent
Ishii et al.

(10) Patent No.: US 8,789,720 B2
(45) Date of Patent: Jul. 29, 2014

(54) FUEL TANK FOR VEHICLE

(71) Applicant: Kawasaki Jukogyo Kabushiki Kaisha, Hyogo (JP)

(72) Inventors: Hiroshi Ishii, Hyogo (JP); Hidenori Arisawa, Hyogo (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 141 days.

(21) Appl. No.: 13/657,102

(22) Filed: Oct. 22, 2012

(65) Prior Publication Data

US 2013/0098917 A1 Apr. 25, 2013

(30) Foreign Application Priority Data

Oct. 25, 2011 (JP) ................................. 2011-233778

(51) Int. Cl.
*B60P 3/00* (2006.01)
*B60P 3/22* (2006.01)
*B60K 15/03* (2006.01)
*B60K 15/077* (2006.01)

(52) U.S. Cl.
CPC ..... *B60K 15/077* (2013.01); *B60K 2015/03111* (2013.01); *B60K 2015/0777* (2013.01); *B60K 2015/03473* (2013.01); *B60K 2015/0344* (2013.01); *B60Y 2200/12* (2013.01)
USPC ........... 220/564; 220/562; 220/563; 280/830; 137/262; 137/264

(58) Field of Classification Search
USPC ........... 220/562, 563, 564; 280/830; 137/262, 137/264, 571, 574
See application file for complete search history.

(56) References Cited

U.S. PATENT DOCUMENTS

| 4,179,036 | A | * | 12/1979 | Pasini | 220/563 |
| 4,453,564 | A | | 6/1984 | Bergesio | |
| 2011/0000921 | A1 | * | 1/2011 | Hawks | 220/563 |
| 2011/0303689 | A1 | * | 12/2011 | Smirra | 220/734 |

FOREIGN PATENT DOCUMENTS

| DE | 28 30 443 | 2/1979 |
| DE | 100 41 678 | 3/2002 |
| EP | 0 803 394 | 10/1997 |
| JP | 2007-186119 | 7/2007 |
| WO | 2009/011678 | 1/2009 |

OTHER PUBLICATIONS

European Search Report (ESR) issued Feb. 4, 2013 in European Patent Application No. EP 12 18 9715.

* cited by examiner

*Primary Examiner* — Fenn Mathew
*Assistant Examiner* — Don M Anderson
(74) *Attorney, Agent, or Firm* — Wenderoth, Lind & Ponack, L.L.P.

(57) ABSTRACT

A fuel tank which has partition walls capable of flowing fuel into a fuel suction port more easily at the time of the acceleration/deceleration of a vehicle is provided.

A fuel tank 11 for vehicle has a fuel suction port 22 through which a fuel pump sucks fuel in the fuel tank 11 from the lower portion of the inner space of the fuel tank 11, a first partition wall 31 surrounding one of the front and and the rear and the sides of the fuel suction port 22 to have an opening to the other of the front and the rear and preventing the fuel from moving to one of the front and the rear, and a second partition wall 32 surrounding the sides and the other of the front and the rear of the first partition wall 31 to have an opening to one of the front and the rear and preventing the fuel from moving to the other of the front and the rear.

6 Claims, 7 Drawing Sheets

FUEL TANK FOR VEHICLE

TECHNICAL FIELD

The present invention relates to a fuel tank for vehicle.

BACKGROUND ART

When the remaining fuel amount in a fuel tank for vehicle is small, and the fuel unbalancedly moves to part of the fuel tank at the time of the acceleration/deceleration of the vehicle, the fuel in the vicinity of a fuel suction port in the fuel tank is reduced, which can cause fuel supply shortage. To prevent such fuel supply shortage due to the moving of the fuel, Patent Literature 1 discloses a configuration in which the periphery of the fuel suction port is covered with a reservoir cup.

CITATION LIST

Patent Literature

[PTL 1] Japanese Patent Application Laid-Open No. 2007-186119

SUMMARY OF INVENTION

Technical Problem

Here, the reservoir cup shown in Patent Literature 1 has two partition walls which each have a front wall or a rear wall and side walls formed with cutaways and are in substantially the same U-shape in top view. The partition walls are provided in front of and behind the fuel suction port so as to be directed opposite to each other in the front-rear direction. As a result, the reservoir cup has very narrow passages (slits) in the front-rear direction through which fuel flows into the fuel suction port. In addition, one of the slits is opened to the front, and the other slit is opened to the rear. Openings are formed of the cutaways of the side walls, and allow the fuel to flow out from within the reservoir cup. The openings are provided on both sides in the vehicle width direction. Therefore, at the time of the acceleration/deceleration of the vehicle, the fuel flowing from the slits into the reservoir cup tends to be reduced.

Accordingly, an object of the present invention is to provide a fuel tank which has partition walls flowing fuel into a fuel suction port more easily at the time of the acceleration/deceleration of a vehicle.

Solution to Problem

The present invention provides a fuel tank for vehicle having a fuel suction port through which a fuel pump sucks fuel in the fuel tank from the lower portion of the inner space of the fuel tank, a first partition wall surrounding one of the front and the rear and the sides of the fuel suction port to have an opening to the other of the front and the rear and preventing the fuel from moving to one of the front and the rear, and a second partition wall surrounding the sides and the other of the front and the rear of the first partition wall to have an opening to one of the front and the rear and preventing the fuel from moving to the other of the front and the rear.

According to the configuration, the second partition wall surrounds the first partition wall. Therefore, the fuel can easily flow into the fuel suction port through gaps between the first partition wall and the second partition wall.

The present invention preferably further has the following configurations.

(1) One of the front and the rear is the front, and the other of the front and the rear is the rear.

(2) Projecting members are provided sideward and outward of the first partition wall and sideward and inward of the second partition wall, and project from a bottom plate section in the inner space.

(3) In configuration (2), gaps between the sides of the first partition wall and the sides of the second partition wall are smaller from one of the front and the rear to the other of the front and the rear.

(4) In configuration (3), the first partition wall has the entire length in the vehicle width direction increased from one of the front and the rear to the other of the front and the rear, and the second partition wall has the entire length in the vehicle width direction increased from the other of the front and the rear to one of the front and the rear.

(5) The first partition wall is formed to have a substantially constant height from the bottom plate section in the inner space in the front-rear direction and the vehicle width direction, the second partition wall is formed to have a substantially constant height from the bottom plate section in the inner space in the front-rear direction and the vehicle width direction, and the second partition wall has a ceiling wall, the first partition wall having an upper end abutting onto the ceiling wall or projecting upward from the ceiling wall.

(6) A guiding member is provided on at least one of the sides of the second partition wall, and guides the fuel from the other of the front and the rear into the space to one of the front and the rear of the opening of the second partition wall.

(7) In configuration (6), the guiding member has an opening to the other of the front and the rear receiving the fuel from the other of the front and the rear, and a side opening discharging the fuel into the space to one of the front and the rear of the second partition wall, and the opening to the other of the front and the rear is larger than the side opening.

According to configuration (1), the first partition wall has the opening to the rear, and the second partition wall has the opening to the front. Therefore, in particular, at the time of the acceleration of the vehicle which needs more fuel, the fuel can easily flow into the fuel suction port.

According to configuration (2), the fuel which has entered into the second partition wall once can be prevented from flowing out from within the second partition wall through the gaps between the first partition wall and the second partition wall.

According to configuration (3), the fuel can quickly flow into the second partition wall through the gaps between the first partition wall and the second partition wall. As a result, the fuel can easily pass over the projecting members.

According to configuration (4), specifically, the gaps between the sides of the first partition wall and the sides of the second partition wall can be smaller from one of the front and the rear to the other of the front and the rear. By this configuration, the gaps can be easily smaller from one of the front and the rear to the other of the front and the rear.

According to configuration (5), the first partition wall and the second partition wall have no openings in the sides thereof. Therefore, the fuel can be prevented from flowing out from the sides of both the partition walls, thereby further holding the fuel in the fuel suction port. In addition, there are no gaps between the upper end of the first partition wall and the ceiling wall of the second partition wall. Therefore, the fuel in the second partition wall can be prevented from passing over the upper end of the first partition wall and flowing out to one of the front and the rear.

According to configuration (6), the guiding member can efficiently discharge the fuel from the other of the front and the rear to the vicinity of the opening of the second partition wall. Therefore, the fuel can flow into the second partition wall more easily.

According to configuration (7), the fuel can quickly flow through the interior of the guide member to the vicinity of the opening of the second partition wall. As a result, the fuel can easily flow from the vicinity of the opening of the second partition wall into the second partition wall.

Advantageous Effects of Invention

In brief, according to the present invention, the fuel tank which has the partition walls capable of flowing the fuel into the fuel suction port more easily at the time of the acceleration/deceleration of the vehicle can be provided.

DESCRIPTION OF EMBODIMENTS

Figure 1:
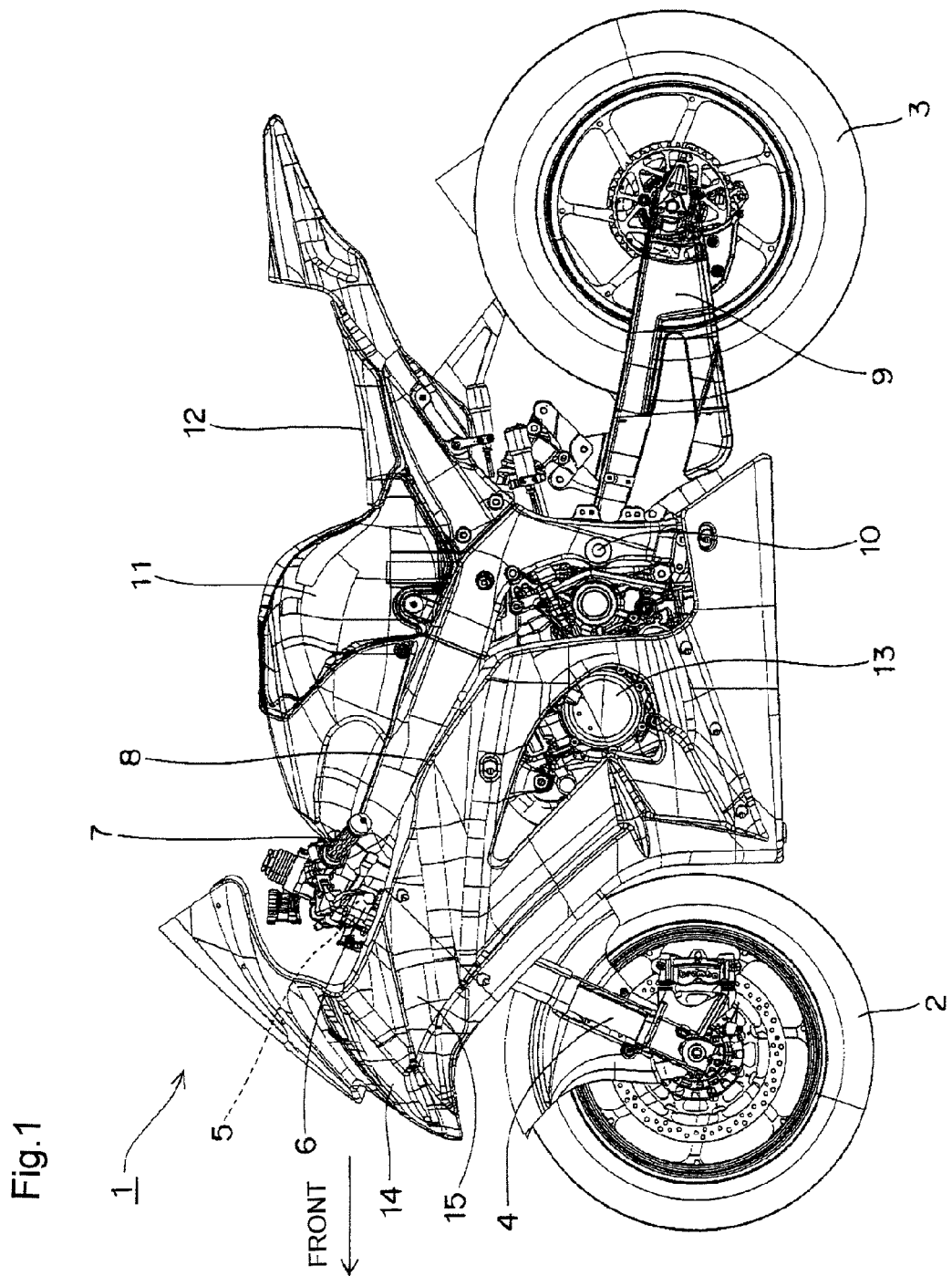
FIG. 1 is a left side view of a motorcycle having a fuel tank according to an embodiment of the present invention.

FIG. 1 is a left side view of a motorcycle 1 having a fuel tank according to an embodiment of the present invention. Further, the concept of the directions used in this embodiment coincides with the concept of the directions seen from the driver of the motorcycle 1.

As shown in FIG. 1, the motorcycle 1 has a front wheel 2, and a rear wheel 3. The front wheel 2 is rotatably supported in the lower portion of a front fork 4 extending in the substantially up-down direction. The front fork 4 is supported by a steering shaft 5. The steering shaft 5 is rotatably supported by a head pipe 6. The front fork 4 has an upper end at which an upper bracket (not shown) is provided. To the upper bracket, a bar type steering handle 7 extending in the right-left direction is attached. The driver swings the steering handle 7 in the right-left direction, so that the front wheel 2 is steered, with the steering shaft 5 as a rotational shaft.

A body frame 8 extends rearward from the head pipe 6. At the rear lower end of the body frame 8, a swing arm 9 has a front end axially supported by a pivot bolt 10. The swing arm 9 has a rear end rotatably supporting the rear wheel 3. Above the body frame 8 and behind the steering handle 7, a fuel tank 11 is arranged. Behind the fuel tank 11, a driver's seat 12 is arranged. Below the fuel tank 11, an engine 13 is mounted. The engine 13 has a rear portion in which an output sprocket (not shown) is arranged. The power of the output sprocket is transmitted via a chain (not shown) to the rear wheel 3.

In front of the steering handle 7, a head lamp 14 is arranged. The head lamp 14 is covered with a front cowl 15. The front cowl 15 is of the full cowl type, and has an upper portion covering the head lamp 14 and a lower portion covering the engine 13.

Figure 2:
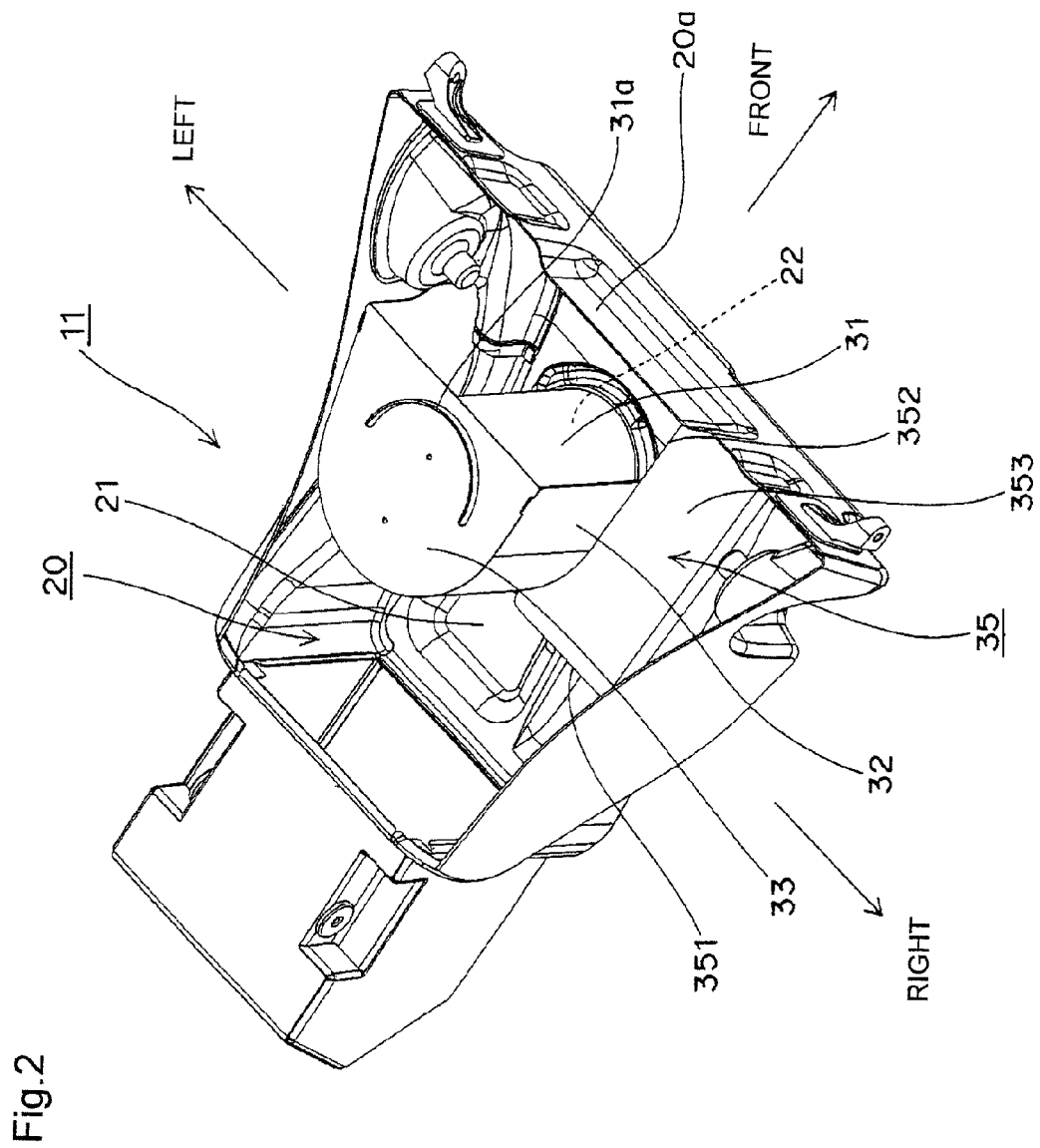
FIG. 2 is a right-front perspective view of the fuel tank portion of the motorcycle of FIG. 1.
Figure 3:
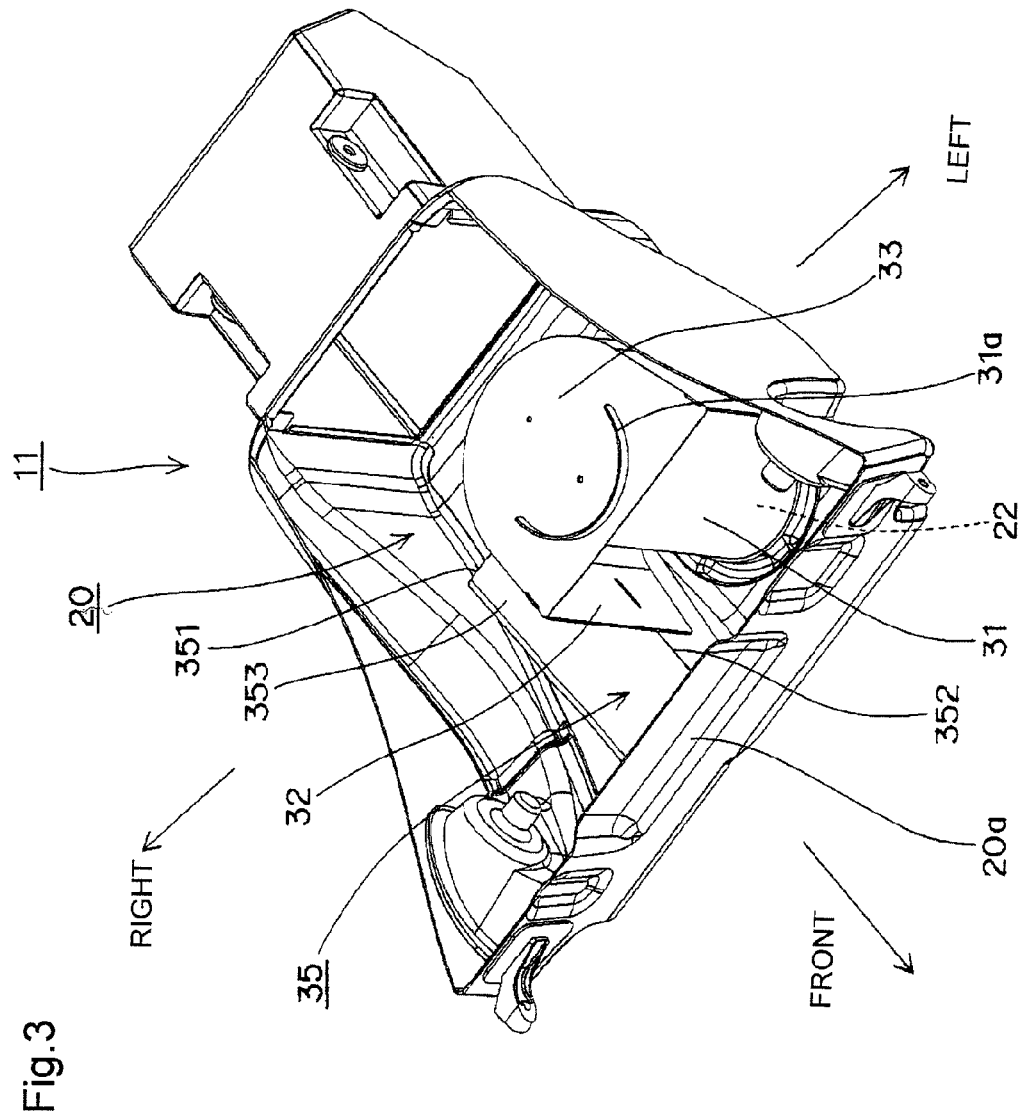
FIG. 3 is a left-front perspective view of FIG. 2.
Figure 4:
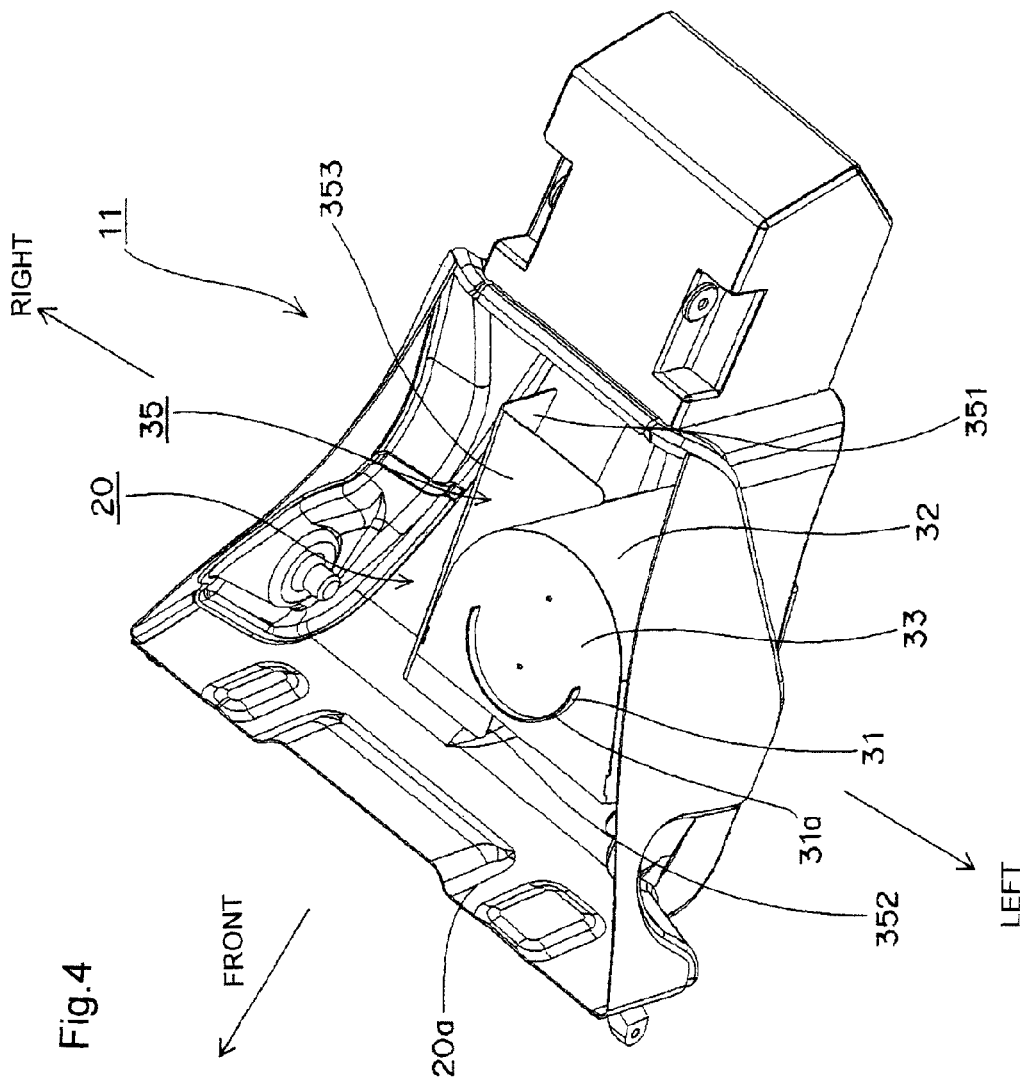
FIG. 4 is a left-rear perspective view of FIG. 2.

FIG. 2 is a right-front perspective view of the fuel tank 11 portion of the motorcycle 1 of FIG. 1, part of a ceiling wall of the fuel tank 11 being removed. FIG. 3 is a left-front perspective view of FIG. 2. FIG. 4 is a left-rear perspective view of FIG. 2.

As shown in FIGS. 2 to 4, the fuel tank 11 has a main body section 20 reserving fuel, and a fuel suction port 22 provided on a bottom plate section 21 of the main body section 20 and through which a fuel pump (not shown) sucks the fuel in the main body section 20. Further, the fuel tank 11 has a first partition wall 31 surrounding the front and the sides of the fuel suction port 22 to have an opening to the rear and preventing the fuel from moving to the front, and a second partition wall 32 surrounding the sides and the rear of the first partition wall 31 to have an opening to the front and preventing the fuel from moving to the rear.

The first partition wall 31 has an arc shape in top view, and is formed to have a constant height from the bottom plate section 21 in the front-rear direction and the vehicle width direction. The second partition wall 32 has an arc shape in top view, and is formed to have a constant height from the bottom plate section 21 in the front-rear direction and the vehicle width direction. The second partition wall 32 has a ceiling wall 33 covering the upper portion thereof. The first partition wall 31 has an upper end 31a projecting upward from the ceiling wall 33. In addition, the first partition wall 31 is arranged inside the second partition wall 32.

Figure 5:
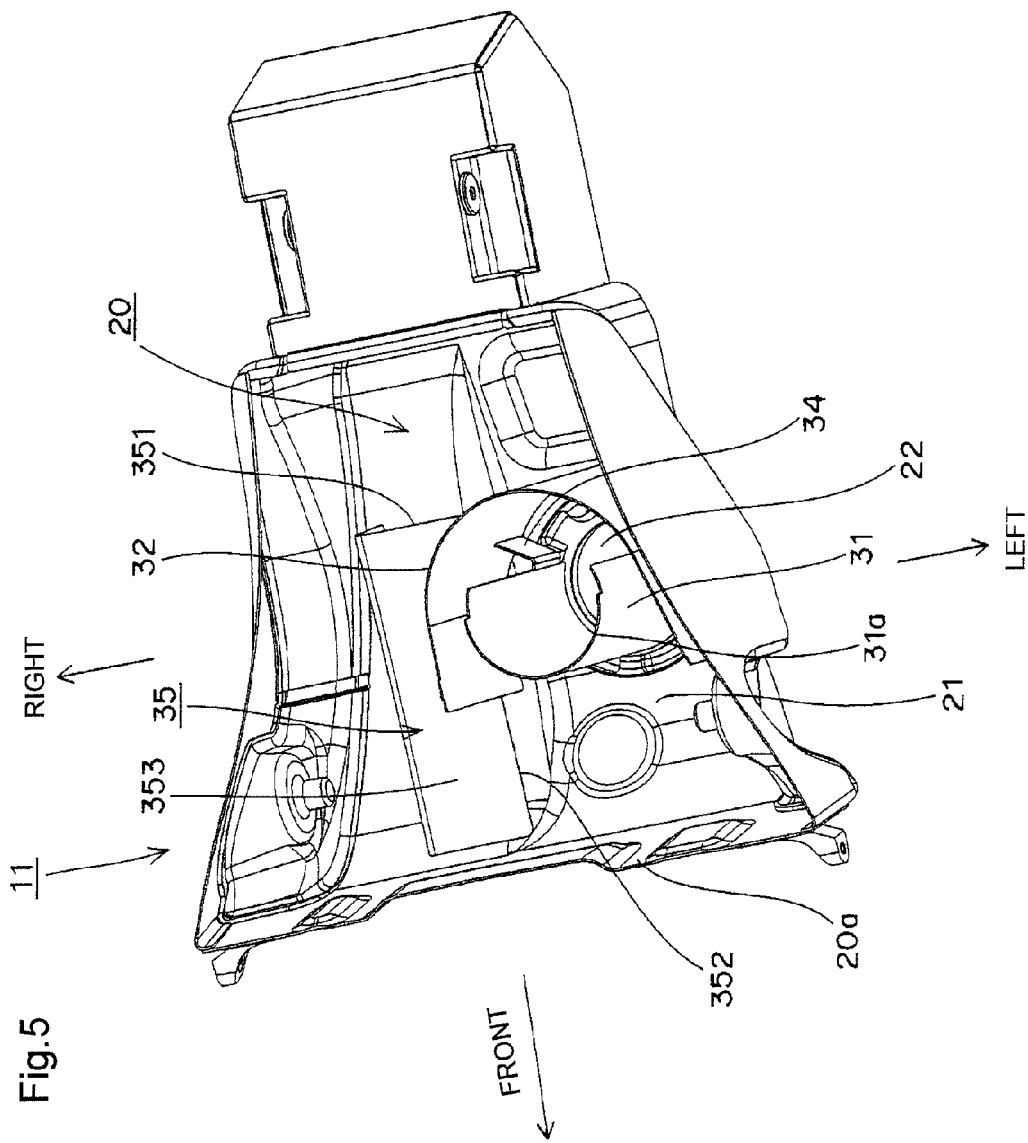
FIG. 5 is a diagram in which a ceiling wall is removed from FIG. 4.

FIG. 5 is a diagram in which the ceiling wall 33 is removed from FIG. 4. In FIG. 5, more clearly, the first partition wall 31 surrounds the front and the sides of the fuel suction port 22, and the second partition wall 32 surrounds the sides and the rear of the first partition wall 31. Although not shown in FIG. 5, the fuel pump is located above the fuel suction port 22, and sucks the fuel in the main body section 20 of the fuel tank 11 from the fuel suction port to supply the fuel to the fuel supply section of the engine 13.

Figure 6:
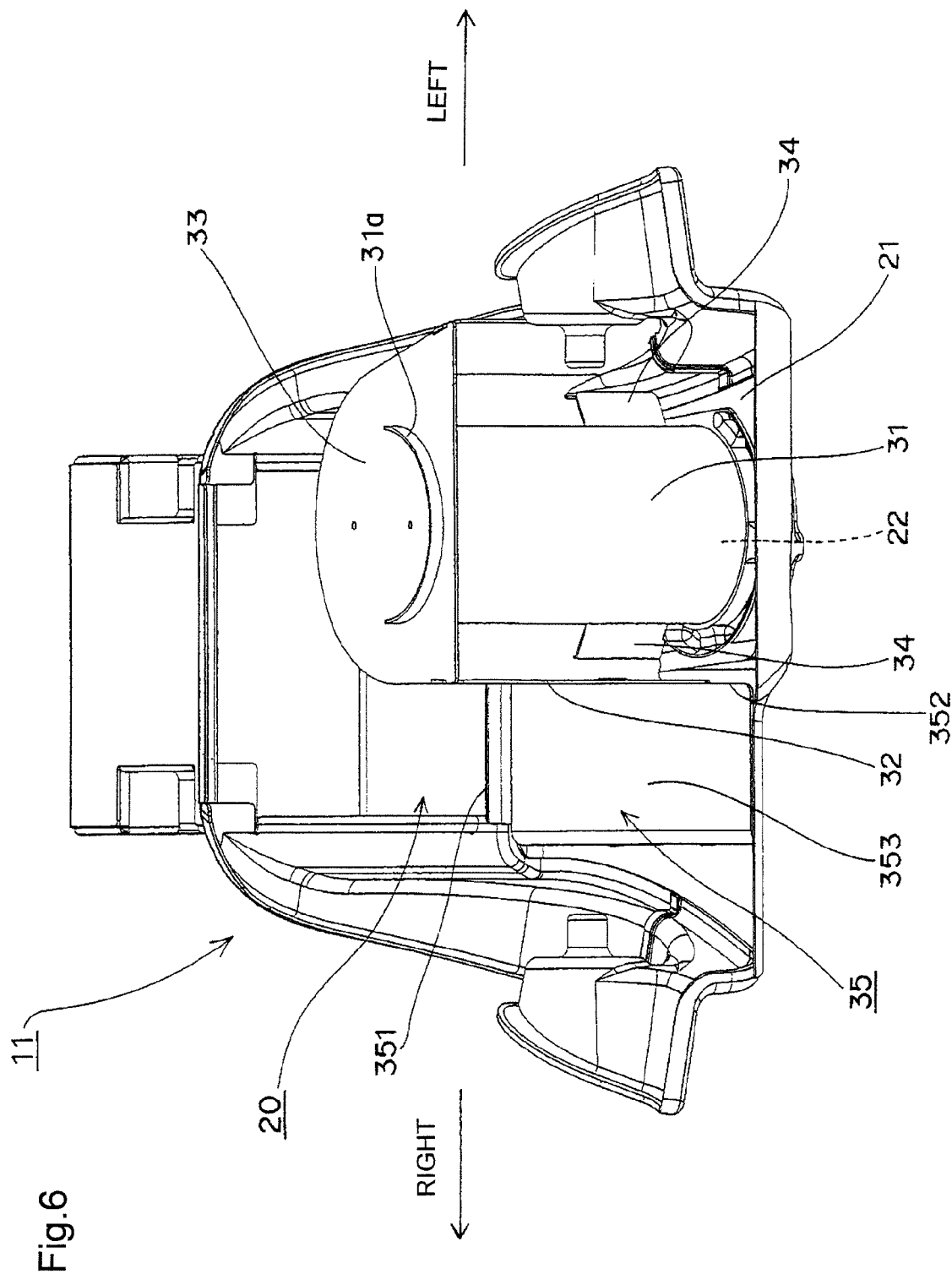
FIG. 6 is a front perspective view of FIG. 2.

FIG. 6 is a front perspective view of FIG. 2. As shown in FIG. 6, projecting members 34 are provided sideward and outward of the first partition wall and sideward and inward of the second partition wall 32, and project upward from the bottom plate section 21. The projecting members 34 have a plate shape which is short in the front-rear direction. The projecting members 34 have a projecting height which is lower than the height of the first partition wall 31 and the height of the second partition wall 32. In addition, as shown in FIG. 5, the projecting members 34 extend radially and outward of the arc formed by the first partition wall 31 from the rear end of the first partition wall 31.

As shown in FIGS. 2 to 6, a guiding member 35 is provided on the side (right side) of the second partition wall 32, and guides the fuel from the rear to the front of the second partition wall 32. The guiding member 35 has a rear opening 351 receiving the fuel from the rear, and a side opening 352 discharging the fuel to the front of the second partition wall 32. The rear opening 351 is formed to be larger than the side opening 352. In addition, the guiding member 35 has a front end and a right side formed with no openings. The guiding member 35 has a ceiling wall 353 which is formed to be inclined forward and downward. The ceiling wall 353 has a height from the bottom plate section 21 which is lower than the ceiling wall 33.

As shown in FIGS. 2 to 5, the main body section 20 is formed in the inner space thereof with a front wall 20a. The front wall 20a erects upward in front of the guiding member 35.

Figure 7:
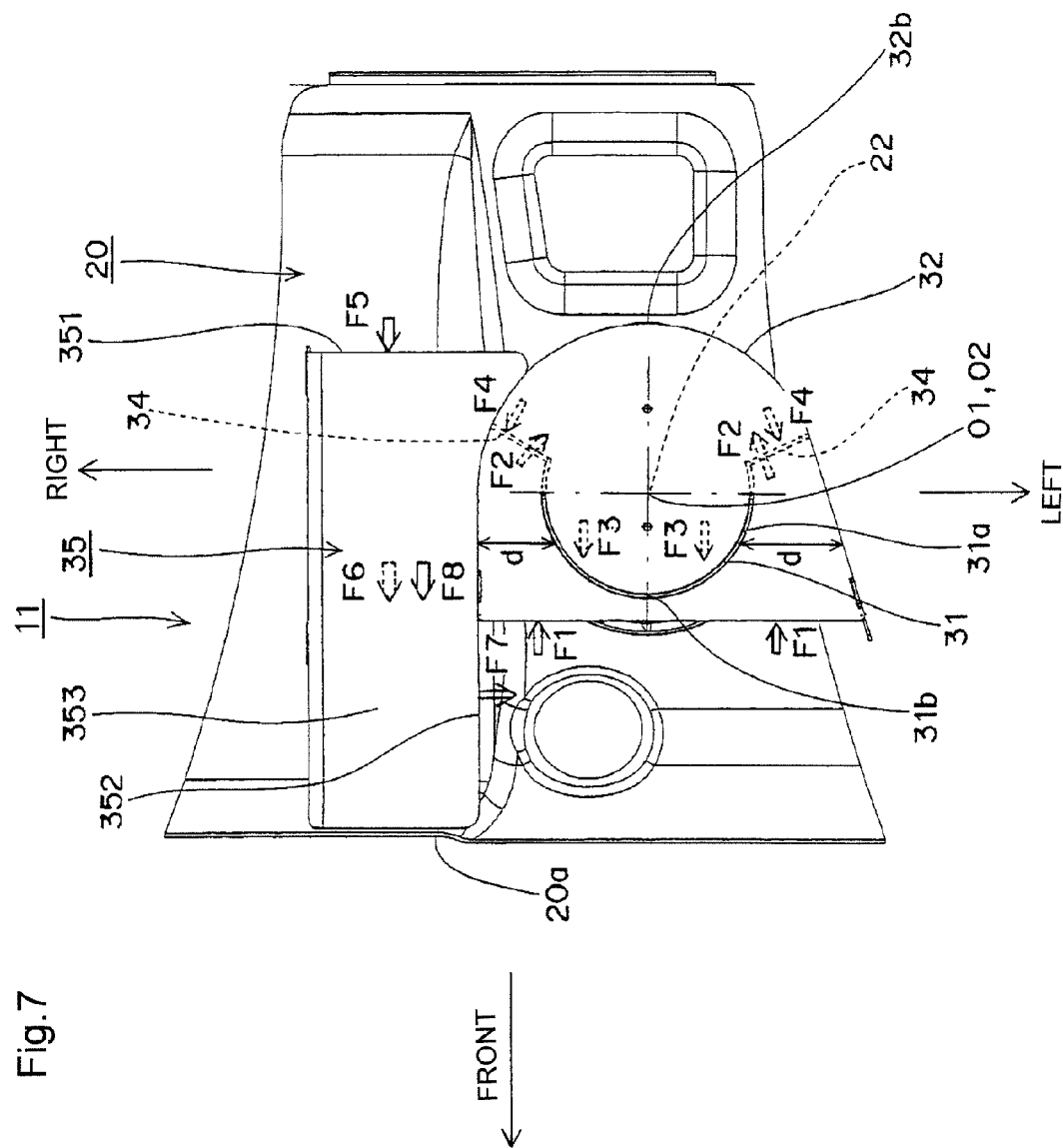
FIG. 7 is a partially top view of FIG. 4.

FIG. 7 is a partially top view of FIG. 4. As shown in FIG. 7, the first partition wall 31 is formed to have the entire length in the right-left direction increased from the front to the rear, and the second partition wall 32 is formed to have the entire length in the right-left direction increased from the rear to the front. As a result, gaps d between the sides of the first partition wall 31 and the sides of the second partition wall 32 are smaller from the front to the rear.

The fuel suction port 22 is located at substantial center O1 of the arc formed by the first partition wall 31, and is located at substantial center O2 of the arc formed by the second partition wall 32. A right-left center 31b of the arc formed by the first partition wall 31 is located at the front end of the first partition wall 31. A right-left center 32b of the arc formed by the second partition wall 32 is located at the rear end of the second partition wall 32. The right-left center 31b and the right-left center 32b are located in the same position in the right-left direction. Center O1 and center O2 are located on a plane connecting the right-left center 31b and the right-left center 32b.

Hereinafter, referring to FIG. 7, the moving of the fuel in the main body section 20 of the fuel tank 11 will be described.

When the motorcycle 1 is accelerated, the fuel in the main body section 20 attempts to move to the rear. Here, the fuel located in front of the first partition wall 31 and the second partition wall 32 flows through gaps d between the first partition wall 31 and the second partition wall 32 into the second partition wall 32 (see arrows F1). The fuel which has flowed into the second partition wall 32 passes over the projecting members 34, and is then located in the rear portion in the second partition wall 32 (see arrows F2). The second partition wall 32 prevents the fuel in the second partition wall 32 from moving to the rear. As a result, even when the remaining fuel amount in the main body section 20 is small, the fuel is reserved around the fuel suction port 22. The fuel pump can deliver the fuel from the fuel suction port 22 into the engine 13.

On the other hand, when the motorcycle 1 is decelerated, the fuel in the main body section 20 attempts to move to the front. Here, the first partition wall 31 prevents the fuel in the second partition wall 32 from moving to the front (see arrows F3). In addition, although the fuel attempts to move through gaps d between the first partition wall 31 and the second partition wall 32 to the front, the projecting members 34 prevent the fuel from moving to the front (see arrows F4). As a result, even when the remaining fuel amount in the main body section 20 is small, the fuel is reserved around the fuel suction port 22. The fuel pump can deliver the fuel from the fuel suction port 22 into the engine 13.

In addition, when the motorcycle 1 is decelerated, the fuel located rearward of the second partition wall 32 flows into the rear opening 351 of the guiding member 35 (see arrow F5), moves to the front in the guiding member 35 (see arrow F6), and is discharged from the side opening 352 to the front of the second partition wall 32 (see arrow F7). As a result, at the time of the next acceleration of the motorcycle 1, the fuel can easily flow into the second partition wall 32.

Further, when the motorcycle 1 is decelerated, of the fuel located rearward of the second partition wall 32, the fuel which does not flow into the rear opening 351 of the guiding member 35 moves to the front above the ceiling wall 353 of the guiding member 35 (see arrow F8). Then, the front wall 20a prevents the fuel from moving to the front of the front wall 20a. As a result, the fuel located in the vicinity of the rear of the front wall 20a can easily flow into the second partition wall 32 at the time of the next acceleration of the motorcycle 1.

According to the fuel tank 11 of the configurations can exhibit the following effects.

(1) The second partition wall 32 surrounds the first partition wall 31. Therefore, the fuel can easily flow into the fuel suction port 22 through gaps d between the first partition wall 31 and the second partition wall 32.

(2) The first partition wall 31 has the opening to the rear, and the second partition wall 32 has the opening to the front. Therefore, in particular, at the time of the acceleration of the motorcycle 1 which needs more fuel, the fuel can easily flow into the fuel suction port 22.

(3) The projecting members 34 are provided sideward and outward of the first partition wall 31 and sideward and inward of the second partition wall 32, and project from the bottom plate section 21. Therefore, the fuel which has entered into the second partition wall 32 once can be prevented from flowing out from within the second partition wall 32 through gaps d between the first partition wall 31 and the second partition wall 32.

(4) Gaps d between the sides of the first partition wall 31 and the sides of the second partition wall 32 are smaller from the front to the rear. Therefore, the fuel can quickly flow into the second partition wall through the gaps d between the first partition wall 31 and the second partition wall 32. As a result, the fuel can easily pass over the projecting members 34.

(5) The first partition wall 31 is formed to have a substantially constant height from the bottom plate section 21 in the front-rear direction and the vehicle width direction, and the second partition wall 32 is formed to have a substantially constant height from the bottom plate section 21 in the front-rear direction and the vehicle width direction. The first partition wall 31 and the second partition wall 32 have no openings in the sides thereof. Therefore, the fuel can be prevented from flowing out from the sides of both the partition walls, thereby further holding the fuel in the fuel suction port.

(6) The second partition wall 32 has the ceiling wall 33, the first partition wall 31 having the upper end 31a projecting upward from the ceiling wall 33. Therefore, there are no gaps between the upper end 31a of the first partition wall 31 and the ceiling wall 33 of the second partition wall 32. Therefore, the fuel in the second partition wall 32 can be prevented from passing over the upper end of the first partition wall 31 and flowing out to the front.

(7) The guiding member 35 is provided on the right side of the second partition wall 32, and guides the fuel from the rear into the space to the front of the opening of the second partition wall 32. The guiding member 35 can efficiently discharge the fuel from the rear to the vicinity of the opening of the second partition wall 32. Therefore, the fuel can flow into the second partition wall 32 more easily.

(8) The guiding member 35 has the rear opening 351 receiving the fuel from the rear, and the side opening 352 discharging the fuel into the space to the front of the second partition wall 32, and the rear opening 351 is larger than the side opening 352. Therefore, the fuel can quickly flow through the interior of the guiding member 35 to the vicinity of the opening of the second partition wall 32. As a result, the fuel can easily flow from the vicinity of the opening of the second partition wall 32 into the second partition wall 32.

(9) The first partition wall 31 has the arc shape. Therefore, the fuel can be smoothly guided from the front through the gaps between the first partition wall 31 and the second partition wall 32 into the second partition wall 32. In addition, the second partition wall 32 has the arc shape. Therefore, the fuel can be smoothly guided from the rear through the outside of the second partition wall 32 to the front.

(10) The first partition wall 31 is arranged inside the second partition wall 32. Therefore, the entire first partition wall 31 can guide the fuel through the gaps between the first partition wall 31 and the second partition wall 32 into the second partition wall 32, thereby improving the fuel guiding effect.

(11) The projecting members 34 extend radially and outward of the arc formed by the first partition wall 31 from the rear end of the first partition wall 31. Therefore, as compared with when the projecting members 34 extend in the right-left direction from the rear end of the first partition wall 31, the fuel which moves through the gaps between the first partition wall 31 and the second partition wall 32 into the second partition wall 32 can easily pass over the projecting members 34.

(12) The main body section 20 is foamed in the inner space thereof with the front wall 20a erecting upward in front of the guiding member 35. Therefore, the front wall 20a prevents the fuel flowing from the rear to the front of the second partition wall 32 from moving to the front of the front wall 20a, so that the fuel can be easily reserved rearward of the front wall 20a. As a result, at the time of the acceleration of the motorcycle 1, the fuel can easily flow into the second partition wall 32.

(13) The right-left center 31b of the first partition wall 31 and the right-left center 32b of the second partition wall 32 are located in the same position in the right-left direction. Therefore, the fuel moving in the front-rear direction between the first partition wall 31 and the second partition wall 32 can be prevented from flowing out to the front through the gaps between the first partition wall 31 and the second partition wall 32.

In this embodiment, in consideration of the parked state of the motorcycle 1 by using the side stand (the side stand is typically provided on the left side in the lower portion of a main frame 10 of the motorcycle 1), the fuel suction port 22 is provided in the left portion of the main body section 20. This is considered so that when the remaining fuel amount in the fuel tank 11 is small, the fuel is also reserved around the fuel suction port 22 even in the parked state of the motorcycle 1. However, the fuel suction port 22 is not limited to be provided in the left portion of the main body section 20, and may be provided at the center of the main body section 20. When the fuel suction port 22 is provided at the center of the main body section 20, the guiding member is provided on either side of the second partition wall 32.

In this embodiment, the first partition wall 31 has the opening to the rear, and the second partition wall 32 has the opening to the front. However, the first partition wall 31 may have the opening to the front, and the second partition wall 32 may have the opening to the rear.

In addition, although the first partition wall 31 and the second partition wall 32 are formed to have a substantially constant height from the bottom plate section in the inner space in the front-rear direction and the vehicle width direction, the height in the front-rear direction may be changed. At the time of changing the height in the front-rear direction, when the first partition wall 31 has the opening to the rear and the second partition wall 32 has the opening to the front, it is preferred that the first partition wall 31 be formed so that the front end thereof is higher than the rear end thereof and that the second partition wall 32 be formed so that the rear end thereof is higher than the front end thereof. This allows the first partition wall 31 to prevent the fuel from moving to the front at the time of deceleration of the vehicle, and allows the second partition wall 32 to prevent the fuel from moving to the rear at the time of the acceleration of the vehicle. Likewise, when the first partition wall 31 has the opening to the front and the second partition wall 32 has the opening to the rear, it is preferred that the first partition wall 31 be formed so that the rear end thereof is higher than the front end thereof and that the second partition wall 32 be formed so that the front end thereof is higher than the rear end thereof.

In this embodiment, the first partition wall 31 and the second partition wall 32 have the arc shape in top view. However, the first partition wall 31 should have the opening to the rear, and the second partition wall 32 should have the opening to the front. For instance, the first partition wall 31 and the second partition wall 32 may have a U-shape in top view, an elliptical shape having an opening, and a triangular shape having an opening. In such a case, it is preferred that the entire length in the right-left direction of the first partition wall 31 be increased from the front to the rear and that the entire length in the right-left direction of the second partition wall 32 be increased from the rear to the front.

In this embodiment, the upper end of the first partition wall 31 projects upward from the ceiling wall 33 of the second partition wall 32. However, the upper end of the first partition wall 31 may abut onto the ceiling wall 33 of the second partition wall 32. That is, it is preferred that the second partition wall 32 have the ceiling wall 33 and that the height of the first partition wall 31 be above the height of the ceiling wall 33.

In this embodiment, the first partition wall 31 is arranged inside the second partition wall 32. However, to obtain the fuel guiding effect of the first partition wall 31, at least part of the first partition wall 31 should be arranged inside the second partition wall 32. However, to guide the fuel, the entire first partition wall 31 is preferably arranged inside the second partition wall 32.

In this embodiment, the projecting members 34 have the plate shape having a short length (thickness) in the front-rear direction. However, the projecting members 34 may have a square shape having an appropriate length (thickness) in the front-rear direction. In this case, the projecting members 34 are preferably formed to be higher to the rear. The projecting members 34 have such a shape, so that while the fuel can be prevented from flowing out to the front through the gaps between the first partition wall 31 and the second partition wall 32, the fuel can easily move from the front through the gaps between the first partition wall 31 and the second partition wall 32 into the second partition wall 32.

In this embodiment, the fuel suction port 22 is provided on the bottom plate section 21 of the main body section 20 of the fuel tank 11. However, the fuel suction port 22 may be provided on the side surface in the lower portion of the main body section 20 of the fuel tank 11.

In this embodiment, the motorcycle has been taken as an example. However, the present invention is not limited to the fuel tank for motorcycle, and is applicable to a fuel tank for vehicle. In particular, the present invention can be preferably used in a vehicle which is frequently accelerated and decelerated and a vehicle which has a small space for accommodating the fuel tank, e.g., a straddle type vehicle. In addition, the present invention can be preferably used for a vehicle which inclines the vehicle body at the time of turning.

The present invention is not limited to the configurations described in the above embodiment and can include various modification examples that those skilled in the art can contrive without departing from the contents described in the claims.

INDUSTRIAL APPLICABILITY

According to the present invention, the fuel tank which has the partition walls capable of flowing the fuel into the fuel suction port more easily at the time of the acceleration of the vehicle can be provided. Therefore, the industrial utilization value is great.

REFERENCE SIGNS LIST

1 Motorcycle
2 Front wheel
3 Rear wheel
4 Front fork
5 Steering shaft
6 Head pipe
7 Steering handle
8 Body frame
9 Swing arm
10 Pivot bolt
11 Fuel tank
12 Seat
13 Engine
14 Headlamp
15 Front cowl
20 Main body section
21 Bottom plate section
22 Fuel suction port
31 First partition wall
32 Second partition wall
33 Ceiling wall
34 Projecting member
35 Guiding member
351 Rear opening
352 Side opening
353 Ceiling wall

The invention claimed is:

1. A fuel tank for vehicle, comprising:
a fuel suction port through which a fuel pump sucks fuel in the fuel tank from the lower portion of the inner space of the fuel tank;
a first partition wall surrounding one of the front and the rear and the sides of the fuel suction port to have an opening to the other of the front and the rear and preventing the fuel from moving to one of the front and the rear;
a second partition wall surrounding the sides and the other of the front and the rear of the first partition wall to have an opening to one of the front and the rear and preventing the fuel from moving to the other of the front and the rear; and
a guiding member is provided on at least one of the sides of the second partition wall, and guides the fuel from the other of the front and the rear into the space to one of the front and the rear of the opening of the second partition wall, wherein the guiding member has an opening to the other of the front and the rear receiving the fuel from the other of the front and the rear, and a side opening discharging the fuel into the space to one of the front and the rear of the second partition wall, wherein the opening to the other of the front and the rear is larger than the side opening.

2. The fuel tank according to claim 1, wherein one of the front and the rear is the front, and the other of the front and the rear is the rear.

3. The fuel tank according to claim 1, wherein projecting members are provided sideward and outward of the first partition wall and sideward and inward of the second partition wall, and project from a bottom plate section in the inner space.

4. The fuel tank according to claim 3, wherein gaps between the sides of the first partition wall and the sides of the second partition wall are smaller from one of the front and the rear to the other of the front and the rear.

5. The fuel tank according to claim 4,
wherein the first partition wall has the entire length in the vehicle width direction increased from one of the front and the rear to the other of the front and the rear,
wherein the second partition wall has the entire length in the vehicle width direction increased from the other of the front and the rear to one of the front and the rear.

6. The fuel tank according to claim 1,
wherein the first partition wall is formed to have a substantially constant height from the bottom plate section in the inner space in the front-rear direction and the vehicle width direction,
wherein the second partition wall is formed to have a substantially constant height from the bottom plate section in the inner space in the front-rear direction and the vehicle width direction,
wherein the second partition wall has a ceiling wall, the first partition wall having an upper end abutting onto the ceiling wall or projecting upward from the ceiling wall.

* * * * *